Patented Feb. 19, 1952

2,585,972

UNITED STATES PATENT OFFICE 2,585,972

PROCESS FOR THE MANUFACTURE OF DIQUATERNARY SALTS OF PYRIMIDYLAMINOQUINOLINES

Gilbert Joseph Stacey, Henry William Thompson, and Charles Henry Vasey, Blackley, Manchester, England, and Francis Henry Swinden Curd, deceased, late of Blackley, Manchester, England, by Muriel Ruth Curd, executrix, Bramhall, England, assignors to Imperial Chemical Industries Limited, a corporation of Great Britain No Drawing. Application November 3, 1949, Serial No. 125,374. In Great Britain November 5, 1948

2 Claims. (Cl. 260—256.4)

1

This invention relates to the manufacture of quinoline derivatives and more particularly it relates to the manufacture of diquaternary salts of pyrimidylamino-quinolines possessing trypanocidal activity.

The compounds with the manufacture of which this invention is concerned may be formulated PqNHQq wherein P stands for a 2-amino- or 2-lower alkylamino-substituted pyrimidine nucleus, which is attached to the linking —NH— group at the 4-position and which may be further substituted in the 6-position by a lower alkyl group, Q stands for a quinoline nucleus which is substituted in the 4-position by an amino- or lower alkylamino-group and which may be further substituted by a lower alkyl group or groups and which bears the linking —NH— group in the 6-position and wherein the symbols q indicate that the preceding nuclei, P and Q respectively, are present in the form of their quaternary salts.

According to the invention the said compounds are manufactured by a process which comprises subjecting to the action of ammonia or of a lower alkylamino a compound of the formula

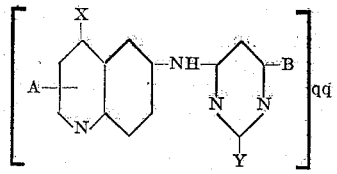

wherein the symbols qq indicate that the compound is a diquaternary salts which carries one quaternary group on the quinoline nucleus and the other on the pyrimidine nucleus, and wherein X and Y stand for amino or lower alkylamino groups or for the groups —SR or —OR, wherein R stands for a hydrocarbon radical provided that of X and Y at least one is —SR or —OR, and wherein A stands for hydrogen or a lower alkyl group and B stands for hydrogen or a lower alkyl group.

The reaction may conveniently be carried out by heating the reactants together in a liquid solvent or diluent. The heating is advisedly carried out in a closed vessel.

The compounds made according to the present invention may also be made by the processes described in the following co-pending United Kingdom applications: No. 23,323/47, No. 23,324/47.

The invention is illustrated but not limited by the following examples in which the parts are by weight.

2

Example 1

20 parts of a solution prepared by saturating ethyl alcohol with ammonia at 0° C., together with 1.8 parts of 4-amino-6-(2'-methylthio-6'-methylpyrimidyl-4'-amino)quinaldine 1:1' - di - methiodide, are heated together in a closed vessel for 16 hours at 135-145° C. The vessel is then cooled and the contents are filtered, the solid residue is stirred with 50 parts of water and the pH of the suspension is adjusted to 5 by addition of hydriodic acid. It is then filtered and the residue is crystallised from water. There are obtained almost colourless needles, consisting of 4-amino-6-(2'-amino-6'-methylpyrimidyl-4'-amino)-quinaldine 1:1'-dimethiodide which has M. P. 310-311° C.

The starting material used in the process of this example may be obtained as follows:

52 parts of 4-chloro-2-methylthio-6-methylpyrimidine, 158 parts of dimethyl sulphate and 300 parts of nitrobenzene are heated together at 90-95° C. for one hour. It is then cooled and extracted with water and 150 parts of sodium iodide are added to the extract, which is then filtered. The residue consists of 4-chloro-2-methylthio-6-methylpyrimidine 1-methiodide of M. P. 185° C. (decomp.). 1.9 parts of this substance are dissolved in 15 parts of hot water and the solution is added to a hot solution of 1.6 parts of 4:6-di-aminoquinaldine methochloride hydrochloride in 12 parts of water and the mixture is boiled for 45 minutes. It is then cooled and filtered and the solid is dissolved in 30 parts of water and 4 parts of sodium iodide are added to the solution which is then filtered. 4-amino-6-(2'-methylthio -6'- methylpyrimidyl - 4'-amino)quinaldine 1:1'-dimethiodide is obtained and crystallised from water, M. P. 253-255° C. (decomp.).

Example 2

4 parts of 6-(2'-amino-6'-methylpyrimidyl-4'-amino)-4-methoxyquinaldine 1:1'-dimethiodide, 4 parts of ammonium chloride and 25 parts of a solution of ammonia in ethyl alcohol, saturated below 5° C., are heated together in a closed vessel at 140° C. for 6 hours. The vessel is then cooled and opened. The excess ammonia is driven off by boiling. The residue is added to 300 parts of water to which hydrochloric acid is added in amount sufficient to give a neutral suspension. This is heated until a solution is obtained. 10 parts of sodium iodide are then added to the solution which is then filtered; the solid is crystallised from water and 4-amino-6-(2'-amino- 6'-methylpyrimidyl-4'-amino)-quinaldine 1:1'-dimethiodide is obtained in the form of cream-coloured crystals, M. P. 312–313° C. (decomp.). This product may be converted into 4-amino-6-(2'-amino-6'-methylpyrimidyl-4'-amino)-quinaldine 1:1'-dimethochloride, M. P. 316–317° C. (decomp.) by dissolving 3 parts of it in 200 parts of boiling water and adding to the solution 35 parts of sodium chloride, filtering off the precipitated solid and crystallising it from water.

The starting material used in the process of this example may be obtained as follows:

30 parts of 6-acetylamino-4-methoxyquinaldine, 80 parts of nitrobenzene, 60 parts of toluene and 20 parts of dimethyl sulphate are stirred and heated together at 90–100° C. for 90 minutes. 80 parts of water are then added and the aqueous layer is separated, heated to 70° C. and a solution of 30 parts of sodium iodide in 40 parts of water is added to it. The mixture is cooled and filtered and the solid is washed with ethyl alcohol and then crystallised from water. The product is 6-acetylamino-4-methoxyquinaldine methiodide monohydrate, M. P. 305–307° C. (decomp.). 30 parts of this substance, 42 parts of concentrated hydrochloric acid and 200 parts of water are boiled under reflux for 30 minutes, then 200 parts of water are added, the mixture is heated to 90–95° C. and sodium carbonate is then added until the pH of the mixture is 3. 24 parts of 4-chloro-2-amino-6-methylpyrimidine 1-methiodide are then added and the mixture is heated at 90–95° C. for 15 minutes, filtered at 80° C. and the residue is washed with 0.1 N-hydrochloric acid, then with water until the washings are no longer acid to Congo red. It is then dissolved in 1000 parts of boiling water and a solution of 100 parts of sodium iodide in 100 parts of hot water is added. The mixture is filtered at 90° C. and the solid is washed with water. There is obtained 6-(2'-amino-6'-methylpyrimidyl-4'-amino)-4-methoxyquinaldine 1:1'-dimethiodide as its hydrate, M. P. 306° C.

*Example 3*

5 parts of 6-(2'-amino-6'-methylpyrimidyl-4'-amino)-4-methylthioquinaldine 1:1'-dimethiodide, 10 parts of ammonium chloride and 250 parts of a solution of ammonia in ethyl alcohol, saturated below 5° C., are heated together in a closed vessel for 6 hours at 130° C. The vessel is then cooled and the contents stirred with 500 parts of water and hydrochloric acid to the point of neutrality. The mixture is then filtered and the solid residue is dissolved in 500 parts of water, the solution is treated with carbon and filtered and to the filtrate there is added at 70–80° C., 30% aqueous sodium chloride solution in excess. It is then filtered while still hot and there is obtained 4-amino-6-(2'-amino-6'-methylpyrimidyl-4'-amino)-quinaldine 1:1'-dimethochloride of M. P. 316–317° C. (decomp.).

The starting material used in the process of this example may be obtained as follows:

23.6 parts of 4-chloro-6-acetylaminoquinaldine, 14 parts of the sodium methyl mercaptide and 100 parts of ethyl alcohol are heated together under reflux for 3 hours and then filtered hot. The filtrate is evaporated to half its original volume and then mixed with 200 parts of water and filtered. The solid is crystallised from ethyl alcohol and is 6-acetylamino-4-methylthioquinaldine, M. P. 220–221° C. 16.3 parts of this substance, 163 parts of nitrobenzene and 8.6 parts of dimethyl sulphate are heated together at 90–95° C. for 20 minutes, cooled and treated with 500 parts of water. The aqueous layer is separated and a solution of 50 parts of sodium iodide in 50 parts of water is added to it. It is then filtered and the solid is washed with ethyl alcohol and crystallised from water. 6-acetylamino-4-methylthioquinaldine methiodide, M. P. 279° C. is obtained, one part of which is boiled with 10 parts of concentrated hydrochloric acid and 200 parts of water for one hour. The mixture is cooled and filtered. The solid is dissolved in 1000 parts of boiling water, sodium iodide is added and the mixture is filtered hot. 6-amino-4-methylthioquinaldine methiodide is obtained, M. P. 320° C. 1 part of this substance, 300 parts of water and 4.5 parts of 4-chloro-2-amino-6-methylpyrimidine 1-methiodide are heated together for 90 minutes, the mixture is cooled and filtered. The solid is washed with methyl alcohol and is 6-(2'-amino-6'-methylpyrimidyl-4'-amino)-4-methylthioquinaldine 1:1'-dimethiodide of M. P. 300–302° C. (decomp.).

*Example 4*

3.2 parts of 6-(2'-amino-6'-methylpyrimidyl-4'-amino)-4-methoxyquinaldine 1:1'-dimethiodide (made as described in Example 2), 3 parts of methylamine hydrochloride, 8 parts of ethanol and 10 parts of methylamine are heated together in a closed vessel for 6 hours at 130–140° C. The vessel is then cooled and the contents are mixed with 200 parts of water and the mixture is neutralised with hydrochloric acid. It is then filtered and the residual solid is dissolved in 300 parts of boiling water. To the solution there are added 20 parts of sodium iodide dissolved in 30 parts of water. It is then filtered hot. There is obtained 4-methylamino-6-(2'-amino-6'-methylpyrimidyl-4'-amino)-quinaldine 1:1'-dimethiodide of M. P. 294–5° C. (decomp.).

*Example 5*

2 parts of 6-(2'-methylthio-6'-methylpyrimidyl-4'-amino)-4-methoxyquinaldine 1:1'-dimethiodide, 2 parts of ammonium chloride and 20 parts of a solution of ammonia in ethanol saturated at −50° C. are heated in a closed vessel at 140° C. for 6 hours. The vessel is then cooled and then contents are mixed with 300 parts of water and the mixture is neutralised with hydrochloric acid. It is then filtered and the residual solid is dissolved in 100 parts of boiling water. The solution is treated with carbon and filtered. The filtrate is treated at 70–80° C. with 30% aqueous sodium chloride solution and filtered. The solid residue consists of 4-amino-6-(2'-amino-6'-methylpyrimidyl-4'-amino)-quinaldine 1:1'-dimethochloride of M. P. 316–317° C. (decomp.).

The starting material used in the process of the above example may be obtained as follows:

Hot solutions of 4.4 parts of 6-amino-4-methoxyquinaldine methochloride hydrochloride monohydrate in 100 parts of water and of 4.75 parts of 4-chloro-2-methylthio-6-methylpyrimidine 1-methiodide in 45 parts of water are mixed and boiled together under reflux for 1 hour and then filtered. The solid is washed with water and dissolved in 200 parts of water. To the solution there is added a solution of 6 parts of sodium iodide in 50 parts of hot water. The mixture is cooled and filtered and the solid is crystallised from water. There is obtained 6-(2'-methylthio-6'-methylpyrimidyl-4'-amino)-4-methoxyquinaldine 1:1'-dimethiodide monohydrate, M. P. 213° C. (decomp.).

Example 6

8.5 parts of 6-(2'-aminopyrimidyl-4'-amino)-4-ethoxyquinoline 1:1'-dimethiodide, 9 parts of ammonium chloride and 120 parts of a solution prepared by saturating ethyl alcohol with ammonia at 0° C. are heated together in a closed vessel at 130–140° C. for 6 hours. The vessel is cooled and the contents are stirred with 500 parts of water and hydrochloric acid is added to the mixture until it is just acid. It is then filtered and the solid is dissolved in 300 parts of boiling water and to the solution a solution of 15 parts of sodium iodide in 100 parts of water is added. The mixture is filtered hot, the filtrate is cooled and filtered and is crystallised from water to give 4-amino-6-(2'-aminopyrimidyl-4'-amino)quinoline 1:1'-dimethiodide monohydrate, M. P. 317–318° C. (decomp.).

The starting material used in the process of this example may be obtained as follows:

A mixture of 10.1 parts of anhydrous 6-acetylamino-4-hydroxyquinoline, 75 parts of nitrobenzene and 50 parts of benzene is stirred and heated to 165° C., cooled and treated with 8.5 parts of diethyl sulphate. The mixture is stirred at 145–155° C. for 4 hours, cooled and extracted with 225 parts of water and the extract is brought to pH 6 by addition of sodium hydroxide. It is then heated to 70° C. and 30 parts of a 20% aqueous solution of sodium hydroxide are added. The mixture is heated for 1 hour at 70° C., cooled and filtered. 6-acetylamino-4-ethoxyquinoline, M. P. 190–191° C. is obtained. It is heated under reflux with an excess of a mixture of equal parts of water and concentrated hydrochloric acid for 1 hour. The mixture is cooled, made alkaline by addition of aqueous sodium hydroxide and filtered. 2.8 parts of the product, 6-amino-4-ethoxyquinoline, M. P. 178–179° C., 1.95 parts of 4-chloro-2-aminopyrimidine and 30 parts of N-hydrochloric acid are heated together for 1 hour, and made alkaline by addition of aqueous sodium hydroxide. 6-(2'-aminopyrimidyl-4'-amino)-4-ethoxyquinoline hydrate is filtered off and crystallised from a mixture of equal parts of methyl alcohol and water; it has M. P. 224–225° C. This product is dehydrated and 2.8 parts of it are heated with 45 parts of nitrobenzene and 20 parts of benzene to 160° C. The mixture is cooled and 2.8 parts of dimethyl sulphate are added to it. It is then heated at 105–115° C. for 4 hours, cooled and filtered. The solid is washed with nitrobenzene and ethyl acetate and dried at 60° C. It is then dissolved in 120 parts of water and to the solution is added a solution of 6 parts of sodium iodide in 30 parts of water. The mixture is filtered and the solid is crystallised from water. 6-(2'-amino-pyrimidyl-4'-amino)-4-ethoxyquinoline 1:1'-dimethiodide monohydrate is obtained, M. P. 324° C. (decomp.).

Example 7

6 parts of 6-(2'-aminopyrimidyl-4'-amino)-4-ethoxyquinaldine 1:1'-dimethiodide, 6 parts of ammonium chloride and 80 parts of a solution made by saturating ethyl alcohol with ammonia at 0° C. are heated together in a closed vessel at 130–140° C. for 6 hours. The vessel is cooled and the contents are added to 350 parts of water and the mixture is just acidified with hydrochloric acid. It is then filtered and the solid is washed with water and dissolved in 300 parts of boiling water. A solution of 10 parts of sodium iodide in 50 parts of water is added to the solution which is filtered hot, cooled and filtered. The solid is crystallised from water and 4-amino-6-(2'-aminopyrimidyl-4'-amino)quinaldine 1:1'-dimethiodide monohydrate, M. P. 300–301° C. (decomp.) is obtained.

The starting material used in the process of this example may be obtained as follows:

A mixture of 4.3 parts of 6-acetylamino-4-hydroxyquinaldine, 30 parts of nitrobenzene and 10 parts of benzene is heated to 165° C., cooled and 3.4 parts of diethyl sulphate are added to it. It is then stirred and heated at 145–155° C. for 4 hours, cooled and extracted with 90 parts of water. The extract is made of pH 6 by addition thereto of aqueous sodium hydroxide and is warmed to 65–70° C. 5 parts of a 20% solution of sodium hydroxide are then added and the mixture is maintained at 65–70° C. for 15 minutes. It is then cooled and filtered and the solid is crystallised from aqueous ethyl alcohol. There is obtained 6-acetylamino-4-ethoxyquinaldine, M. P. 218° C. This is heated under reflux with an excess of a mixture of equal parts of water and concentrated hydrochloric acid for 1 hour and there is thus obtained 6-amino-4-ethoxyquinaldine, M. P. 144–145° C. A mixture of 1 part of this 6-amino-4-ethoxyquinaldine, 0.65 part of 4-chloro-2-aminopyrimidine and 10 parts of N-hydrochloric acid is boiled for 1 hour, cooled and made alkaline by addition of aqueous sodium hydroxide. 6-(2'-aminopyrimidyl-4'-amino)-4-ethoxyquinaldine monohydrate is filtered off and crystallised from aqueous methyl alcohol. It has M. P. 217–219° C. 1.9 parts of this product are dehydrated with 30 parts of nitrobenzene and 20 parts of benzene to 60° C. and 1.8 parts of dimethyl sulphate are added to the cooled mixture which is then stirred and heated at 105–115° C. for 4 hours, cooled and filtered. The solid is washed with nitrobenzene and ethyl acetate and dried. It is then dissolved in 200 parts of hot water and to the solution there is added a hot solution of 4 parts of sodium iodide in 10 parts of water. The solution is then filtered and the filtrate is cooled and 6-(2'-aminopyrimidyl-4'-amino)-4-ethoxyquinaldine 1:1'-dimethiodide dihydrate is filtered off and crystallised from water. It has M. P. 342° C. (decomp.).

Example 8

10 parts of 6-(2'-methylamino-6'-methylpyrimidyl-4'-amino)-4-phenoxyquinaldine 1:1'-dimethiodide, 10 parts of ammonium chloride and 100 parts of a solution made by saturating ethyl alcohol with ammonia at 0° C. are heated together in a closed vessel at 150° C. for 6 hours, cooled and mixed with 600 parts of water. The mixture is made acid by addition of hydrochloric acid and filtered. The solid is dissolved in 400 parts of boiling water and a solution of 15 parts of sodium iodide in 50 parts of water is added. The mixture is filtered hot and the filtrate is cooled and filtered. The solid is crystallised from water to give 4-amino-6-(2'-methylamino-6'-methylpyrimidyl-4'-amino)quinaldine 1:1'-dimethiodide dihydrate, M. P. of 303–305° C. (decomp.).

The starting material used in the above example may be obtained as follows:

A mixture of 23.4 parts of 4-chloro-6-acetylaminoquinaldine, 11.6 parts of sodium phenoxide and 115 parts of phenol is heated for 3 hours at 180–190° C. in a stream of nitrogen. It is then cooled and added to a stirred solution of 80 parts of sodium hydroxide in 1400 parts of water. The mixture is filtered, the solid is washed with dilute aqueous sodium hydroxide and then with water and then dissolved in hot aqueous methyl alcohol. The mixture is cooled and filtered. 6-acetylamino - 4 - phenoxyquinaldine hydrate is obtained. 19.6 parts of this substance is dehydrated and heated at 90–95° C. for 2 hours with 200 parts of nitrobenzene and 10.1 parts of dimethyl sulphate. The mixture is then cooled and filtered and the solid is boiled for 30 minutes with 150 parts of a mixture of equal parts of water and concentrated hydrochloric acid, filtered hot and cooled and again filtered. The solid product is 6-amino - 4 - phenoxyquinaldine methochloride hydrochloride which is crystallised from a mixture of equal parts of water and concentrated hydrochloric acid. It has M. P. 270° C. (decomp.). A solution of 2.9 parts of this 6-amino-4-phenoxyquinaldine methochloride hydrochloride in 100 parts of hot water is mixed with a solution of 2.55 parts of 4-chloro-2-methylamino-6-methylpyrimidine 1-methiodide in 25 parts of hot water and the mixture is boiled under reflux for 75 minutes. It is then cooled and filtered. The solid is washed with cold water and then dissolved in 150 parts of hot water and to the solution a hot solution of 6.5 parts of sodium iodide in 50 parts of water is added. The mixture is filtered and the solid product is crystallised from water to give 6 - (2' - methylamino - 6' - methylpyrimidyl-4'-amino)-4-phenoxyquinaldine 1:1'-dimethiodide dihydrate, M. P. 268–269° C. (decomp.).

*Example 9*

1.8 parts of 4-methoxy-6-(2'-methylthio-6'-methylpyrimidyl - 4' - amino)quinaldine 1:1'-dimethiodide, 12 parts of ethylamine and 12 parts of ethyl alcohol are heated together in a closed vessel at 130–140° C. for 6 hours. The mixture is cooled and poured into 120 parts of water and hydrochloric acid is added until the mixture is just acid. It is then filtered and the solid is washed with water and dissolved in 120 parts of boiling water and to the solution a solution of 2.5 parts of sodium iodide in 10 parts of water is added. The mixture is filtered and the filtrate is cooled and filtered and the solid is crystallised from water to give 6-(2'-ethylamino-6'-methylpyrimidyl-4'-amino) - 4 - ethylaminoquinaldine 1:1'-dimethiodide monohydrate, M. P. 319° C. (decomp.)

*Example 10*

1.35 parts of 6-(2'-amino-6'-methylpyrimidyl-4'-amino) -4-benzylthioquinaldine 1:1' - dimethiodide, 1.35 parts of ammonium chloride and 13.5 parts of a solution made by saturating ethyl alcohol with ammonia at 0° C. are heated together in a closed vessel at 130–140° C. for 6 hours. The mixture is then cooled and poured into 60 parts of water and hydrochloric acid is added to the mixture until just acid. It is then filtered, the solid is washed with water and dissolved in 37.5 parts of boiling water and to the mixture is added a solution of 2.25 parts of sodium iodide in 7.5 parts of water. The mixture is filtered hot, cooled and again filtered. The solid is crystallised from water to give 4-amino-6-(2'-amino-6'-methylpyrimidyl-4' - amino)quinaldine 1:1'-dimethiodide dihydrate, M. P. 314–315° C.

The starting material used in this example may be obtained as follows:

6.2 parts of benzyl mercaptan are added to 25 parts of ethyl alcohol in which 1.15 parts of sodium have been dissolved. To the solution 7.05 parts of 4-chloro-6-acetylaminoquinaldine are added and the mixture is stirred and boiled under reflux for 3½ hours and then filtered hot. The filtrate is cooled and again filtered and the solid is 6 - acetylamino - 4 - benzylthioquinaldine which is crystallised from methyl alcohol and then has M. P. 213° C. 19.2 parts of this 6-acetylamino-4-benzylthioquinaldine, 9.45 parts of dimethyl sulphate and 200 parts of nitrobenzene are heated together for 2 hours at 90–95° C. The mixture is then cooled and filtered and the solid is washed with nitrobenzene and then with ethyl acetate. It is then boiled for 1 hour with a mixture of 600 parts of water and 120 parts of concentrated hydrochloric acid, cooled and filtered. The solid is crystallised from water and 6-acetylamino-4-benzylthioquinaldine methochloride dihydrate is obtained, M. P. 227–229° C. Hot solutions of 7.5 parts of this 6-acetylamino-4-benzylthioquinaldine methochloride in 1100 parts of water and of 6.4 parts of 4-chloro-2-amino-6-methylpyrimidine 1-methiodide in 70 parts of water and 22.5 parts of N-hydrochloric acid are mixed and the mixture is boiled under reflux for one hour. It is then cooled and filtered and the solid is washed with acetone and dissolved in 600 parts of hot water. A hot solution of 20 parts of sodium iodide in 60 parts of water is added to this solution which is then cooled and filtered and the solid is crystallised from water. 6 - (2' - amino-6'-methylpyrimidyl-4'-amino)-4-benzylthioquinaldine 1:1' - dimethiodide dihydrate, M. P. 232° C. (decomp.) is obtained.

*Example 11*

1.15 parts of anhydrous 6-(2'-amino-6'-methylpyrimidyl-4' - amino) - 4 - methoxyquinaldine 1:3'-dimethiodide, 1.15 parts of ammonium chloride and 12 parts of a solution prepared by saturating ethyl alcohol with ammonia at 0° C. are heated in a closed vessel at 130–140° C. for 6 hours. The mixture is cooled and poured into 40 parts of water and to the mixture hydrochloric acid is added until it is just acid. It is then filtered and to the filtrate is added first a solution of 4 parts of sodium iodide in 5 parts of water and then aqueous sodium carbonate until it is alkaline to Brilliant Yellow. It is then filtered and the solid is crystallised from water to give 4 - amino - 6-(2'-amino-3':6'-dimethyldihydropyrimidyl-4'-amino)quinaldine 1-methiodide M. P. 316° C. (decomp.). This substance may be recrystallised from a 4% solution of sodium iodide in water containing sufficient hydrochloric acid to give a pH of 3 and 4-amino-6-(2'-amino - 6' - methylpyrimidyl-4' - amino) quinaldine 1:3'-dimethiodide, M. P. 290° C. (decomp.) is obtained.

46 parts of 6-acetylamino-4-methoxyquinaldine are heated at 90–95° C. for 90 minutes with 31.5 parts of dimethyl sulphate and 350 parts of nitrobenzene. The mixture is cooled and filtered and the solid is washed with nitrobenzene and then with ethyl acetate. It is then boiled under reflux for 30 minutes with a mixture of 150 parts of water and 300 parts of concentrated hydrochloric acid and then filtered. 1600 parts of acetone are added to the filtrate and 6-amino-4-methoxyquinaldine methochloride hydrochloride monohydrate is filtered off and crystallised from a mixture of acetone and 2N-hydrochloric acid. It has M. P. 280–281° C. (decomp.). This product is converted to the methochloride, M. P. 231° C. (decomp.) by dissolving it in water, and adding to the solution an excess of sodium hydroxide followed by sodium chloride. It is crystallised from methyl alcohol. A mixture of 2.4 parts of 6-amino-4-methoxyquinaldine methochloride, 1.9 parts of 4-iodo-2-amino-6-methylpyrimidine 3-methiodide and 20 parts of water is boiled under reflux for 15 minutes, then cooled and filtered. To the filtrate is added a solution of 3 parts of sodium iodide in 50 parts of water. It is then filtered and the solid is crystallised from dilute aqueous sodium iodide in the presence of a little hydrochloric acid and 6-(2'-amino-6'-methylpyrimidyl-4'-amino)-4-methoxyquinaldine 1:3'-dimethiodide, M. P. 246° C. (decomp.) is obtained.

*Example 12*

A mixture of 0.92 part of 6-(2'-methylthio-6'-methylpyrimidyl-4' - amino) -4 - methoxyquinaldine 1:1'-dimethiodide, 6 parts of ethylamine and 8 parts of toluene is heated in a closed vessel at 130-140° C. for 6 hours, then cooled and filtered. The solid is washed with ethyl acetate, dried and dissolved in 65 parts of boiling water containing sufficient hydrochloric acid to give a pH of 4. A solution of 1.5 parts of sodium iodide in 5 parts of water is added to the solution and the mixture is filtered and filtered hot. The filtrate is cooled and filtered and the solid is crystallised from water. 6-(2'-ethylamino-6'-methylpyrimidyl - 4'-amino) - 4-ethylaminoquinaldine 1:1'-dimethiodide monohydrate of M. P. 317° C. (decomp.) is obtained.

*Example 13*

A mixture of 0.92 part of 6-(2'-methylthio-6'-methylpyrimidyl - 4'-amino) - 4-methoxyquinaldine 1:1'-dimethiodide, 6 parts of ethylamine and 8 parts of anisole is heated in a closed vessel at 130-140° C. for 6 hours. It is then cooled and filtered and the solid is washed with ethyl acetate in 65 parts of boiling water containing sufficient hydrochloric acid to give a pH of 4. A solution of 1.5 parts of sodium iodide in 5 parts of water is then added and the mixture is boiled and filtered hot. The filtrate is cooled and 6-(2'-ethylamino-6'-methylpyrimidyl-4'-amino) - 4-ethylaminoquinaldine 1:1'-dimethiodide is filtered off and crystallised from water. It has M. P. 318° C. (decomp.).

We claim:

1. Process for the manufacture of diquaternary salts of pyrimidylaminoquinolines having the general formula:

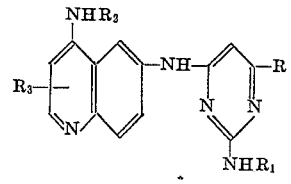

wherein R is a radical from the group consisting of lower alkyl and —NH alkyl; $R_1$ and $R_2$ are radicals from the group consisting of hydrogen and lower alkyl without $R_1$ and $R_2$ both being simultaneously hydrogen atoms; and $R_3$ is a radical from the group consisting of hydrogen and lower alkyl, which comprises reacting a diquaternary salt of a compound of the general formula:

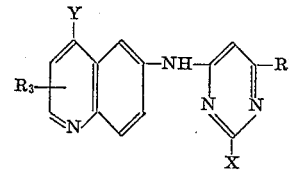

wherein one of the radicals X and Y is a radical from the group consisting of —S alkyl and —O alkyl, and the other is a radical from the group consisting of —S alkyl, —O alkyl, —NH$_2$ and —NH alkyl, and R and $R_3$ have the significance above indicated, with a compound from the group consisting of ammonia and lower mono-alkyl-amines.

2. A process as claimed in claim 1 wherein said reaction is brought about by heating the reactants together in a solvent.

GILBERT JOSEPH STACEY.
HENRY WILLIAM THOMPSON.
CHARLES HENRY VASEY.
MURIEL RUTH CURD,
*Executrix of the Estate of Francis Henry Swinden Curd, Deceased.*

No references cited.